United States Patent

[11] 3,621,455

[72] Inventor  Milton Green
    926 Buddington Road, Groton, Conn. 06340
[21] Appl. No. 59,040
[22] Filed July 28, 1970
[45] Patented Nov. 16, 1971
    Continuation-in-part of application Ser. No. 661,732, Aug. 18, 1967, now abandoned.

[54] PINCH EFFECT LASER
    7 Claims, 8 Drawing Figs.
[52] U.S. Cl. .................................................. 331/94.5, 317/235 N
[51] Int. Cl. .................................................. H01s 3/18
[50] Field of Search .......................................... 331/94.5; 317/235 N; 313/108 D

[56] References Cited
    OTHER REFERENCES

Chang et al.: Phys. Rev. Lett., Vol. 15, pp. 453–6, Sept., 1965

Melngoilis: Applied Physics Lett., Vol. 6, pp. 59–6, Feb., 1965
Phelan et al: App. Phys. Lett., Vol. 3, pp. 143–5, Nov. 1963
Phelan et al.: App. Phys. Lett., Vol. 6, pp. 70–71, Feb., 1965

Primary Examiner—William L. Sikes
Assistant Examiner—Edward S. Bauer
Attorneys—Richard S. Sciascia and Louis B. Applebaum ABSTRACT: A semiconductor laser in which the efficiency is improved by forcing the PN pairs into the central volume of the laser rod. The redistribution of PN pairs is effected by adding one or more magnetic or electric fields or both to the semiconductor laser device in such a manner that a radially inward Lorentz force is produced on all charge carriers. The fields which are used can be an axial (with respect to the laser rod) invariant magnetic field, an axial electric field, a combination of an axial invariant magnetic field and an azimuthal electric field, or a combination of an invariant, axial magnetic field and a properly superposed $rf$ induction field. Pumping is accomplished by optical excitation, or hot charge carrier injection, or both.

INVENTOR.
MILTON GREEN
BY Philip Schneider
Lou B. Appleton
ATTORNEYS

INVENTOR.
MILTON GREEN
BY Philip Schneider
Louis B. Appleton
ATTORNEYS

PINCH EFFECT LASER

This application is a continuation-in-part of my application, Ser. No. 661,732 filed 18 Aug. 1967 for PINCH EFFECT LASER and now abandoned.

The invention described herein may be manufactured and used by or for The Government of the United States of America for governmental purposes without the payment of any royalties thereon or therefor.

This invention relates to laser devices and especially to a method and means for improving the efficiency of laser action in semiconductors by means of the pinch effect.

Laser action is a special form of luminescence. In laser devices energy of higher level (larger quanta) is reemitted as coherent light in a very narrow bandwidth. The properties of laser beams of light have value in communications, engineering, medicine and other technological fields.

Laser action is effected in a solid by the following pumping mechanisms: (a) optical excitation, (b) electron beam irradiation, (c) current injection at a PN junction, and (d) hot carrier injection. (c) has shown the greatest efficiency. However, power output is limited with this method, since laser action is confined to the small volume of a PN junction. It is therefore desirable to find methods of increasing the efficiency of the optical and hot carrier injection modes of pumping, since higher power outputs are obtainable therewith.

An object of this invention is to improve the efficiency of the optical excitation and hot carrier injection modes of pumping in laser devices.

Another object is to improve the efficiency of optically pumped or hot carrier pumped lasers by radially pinching the pump-induced electron-hole pair current.

The objects and advantages of the invention are provided by utilizing the Lorentz-force effect to concentrate the charge carriers in a semiconductor laser rod in the central volume of the rod rather than in the peripheral volume. This redistribution of the PN pairs makes for higher efficiency in the light-producing process.

Other objects and advantages will appear from the following description of an example of the invention, and the novel features will be particularly pointed out in the appended claims.

Figure 1:
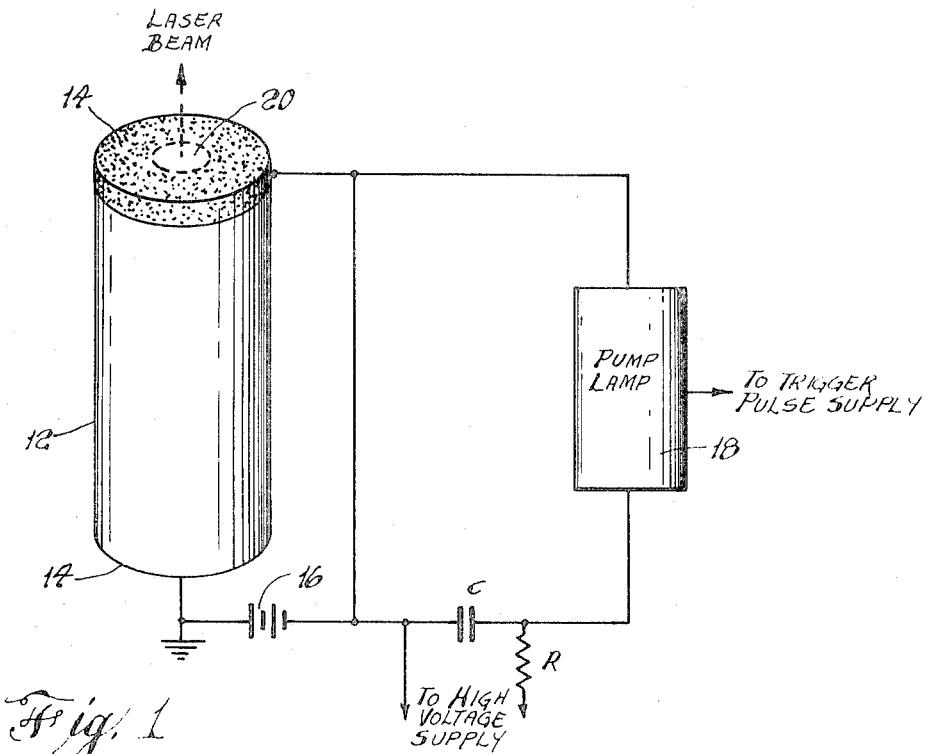
FIG. 1 is a schematic illustration of an embodiment of the invention which utilizes a Z-axis directed or axial electric field.

FIG. 1 is a schematic illustration of one embodiment of the inventive concept. A semiconductor laser rod 12 is arranged for operation in a periodic pulsed mode. The laser rod 12 carries the usual optically reflective coatings 14 at each end. The semiconductor rod 12, cut to the appropriate length, plus the optical reflective coatings, provide the Fabry-Perot-type optical cavity resonant to the desired wavelength and essential to laser action. The coatings should also have good electrical conductivity. The coating material may be gold, silver, bismuth, tin, indium, etc. An electric field is set up axially along the rod 12 by connecting a source of DC voltage 16 across the end coatings 14. A pumping lamp 18, which may be an electronic flash lamp, is arranged to be periodically flashed by a trigger pulse.

Each flash of light from the pump lamp 18 creates hole-electron pairs in the semiconductor laser rod 12. This raises the conductivity of the semiconductor rod 12 and permits the electric field along the rod to initiate an axial flow or current of charge carriers along the rod. The current sets up a magnetic field transverse to the current flow, the internal portion of which rings the axis of the cylinder and the Lorentz Force reaction between the moving charges of the electric current and the magnetic field ($\bar{F} = q\ \bar{v} \times \bar{B}$) results in a force on each charge which is directed radially inward relative to the rod. (See "The International Dictionary of Physics and Electronics" published by D. Van Nostrand Company, Inc., page 482, for the Lorentz force formula.)

The Lorentz Force results in a pinch effect on the electron-hole charge carriers, decreasing their distribution in the peripheral volume of the rod and increasing their distribution in the central volume of the rod where recombination of the pumped electron-hole pairs is most effective in producing the laser beam. The laser beam emerges along the central axis from a semitransparent area 20 on the top coating. The concentration of the pumped pairs in the most effective light-producing volume of the rod results in increasing the efficiency of the laser action.

If the current consists primarily of charge carriers of one sign, a Hall field results and the radial flow of charge carriers, or the pinch effect, is very small. To provide a substantial pinch effect, the current should consist of fairly equal numbers of charge carriers of opposite sign. This occurs when the semiconductor is of slightly P-type material and the doping should be done with this in mind. A material doped so that $P \approx nb^2$ at equilibrium would be suitable. Semiconductor materials that may be used include, for example, GaAs, GaP, GaAsP, AlP, InAs, InSb, and CdSe.

In the equation $P \approx nb^2$, $P$ is the hole density of the doped material, $n$ is the electron density, and $b$ is the electron - to - hole mobility ratio.

In the current-field configuration of FIG. 1, for a semiconductor material having carrier mobilities of the order of $10^3$ cm.$^2$/volt sec., and charge carrier densities of about $10^{17}$ carriers/cm.$^3$, a pinch radial electric field of about 1 volt/cm. is developed at a distance of 1 cm. from the center of the rod when the axial current is $10^3$ amperes and the electric field along the axis equals 60 volts/cm. The magnetic field, B, is 200 gauss. For the same material in the current field configuration to be described in FIG. 2, if the applied DC magnetic field, B, is $10^4$ gauss, then to produce a radial pinch field of 1 volt/cm. requires an induced electric field of approximately 10 volts/cm. at a radius of 1 cm. The time rate of change of flux lines per cm.$^2$ necessary to generate the electric field of 10 volts/cm. is $2 \times 10^9$ gauss/sec., which requires rf frequencies in the order of $10^6$ to $10^7$ Hertz.

Figure 2:
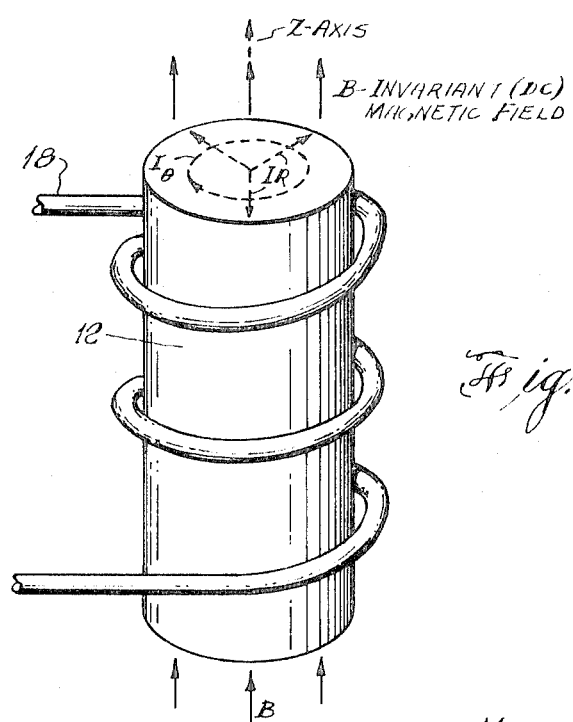
FIG. 2 is a schematic which illustrates the physical aspects of the photomagnetoelectric effect (PME effect) in a semiconductor rod.

FIG. 2 schematically illustrates a physical effect which may be called the photomagnetoelectric effect (PME effect). Here a strong, invariant (DC) magnetic field B is applied in the axial (Z-axis) direction. When the pump lamp 18 is flashed, the light produces electron-hole pairs in the laser rod 12 making it conductive. The geometry is such that a radial concentration gradient is developed which produces a radially inward ambipolar diffusion current, $I_r$. The interaction of this radially inward current $I_r$, with the steady magnetic field, B, induces an azimuthal current flow $I_\theta$.

Figure 3:
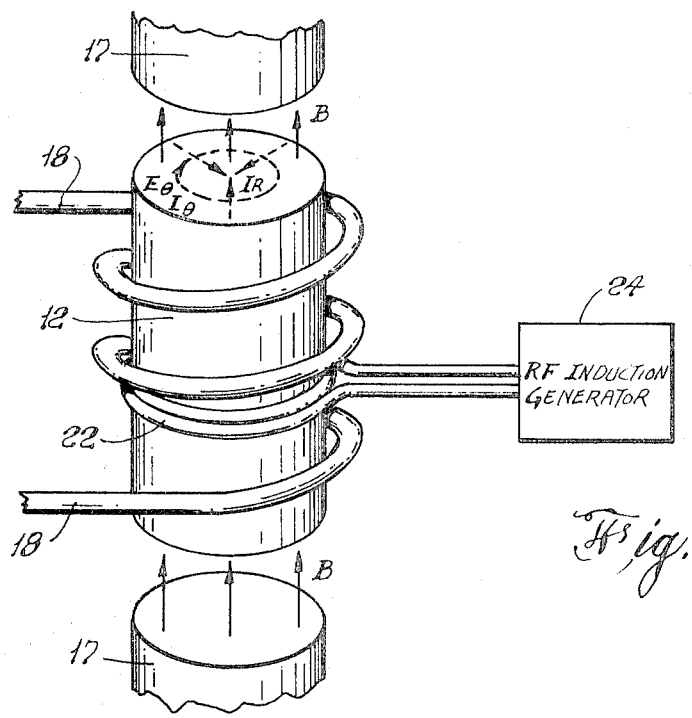
FIG. 3 is a schematic illustration of a second embodiment of the invention which utilizes an axial invariant magnetic field and a properly superposed rf induction field.
Figure 4A:
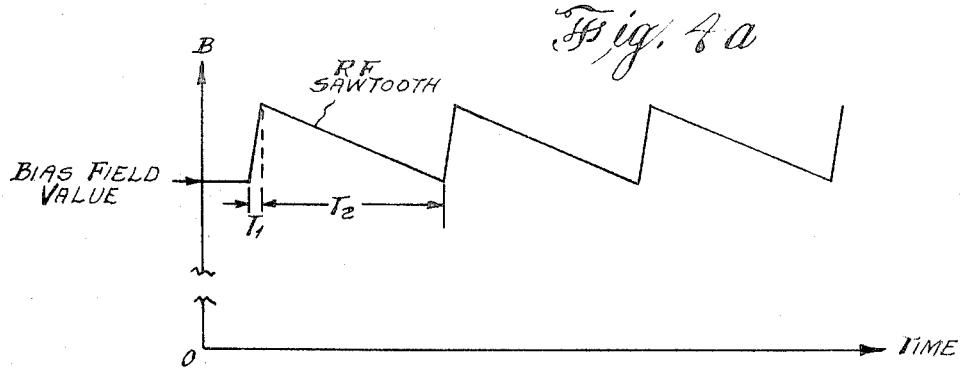
FIG. 4A is a waveform showing of the rf sawtooth induction field superposed on the steady field value.
Figure 4B:
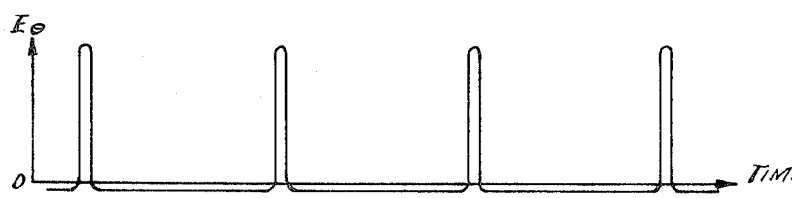
FIG. 4B is a waveform showing of the azimuthal current as it relates in time to the sawtooth induction field of FIG. 4A.

FIG. 3 illustrates another embodiment which reverses the PME effect. This embodiment employs an invariant magnetic field, B, and a strong radio frequency (rf) field the wave shapes of which is preferably a sawtooth. The invariant magnetic field, B, may be produced by a magnet, the poles 17 of which are indicated, or by a suitable coil with direct current flowing therethrough. The rf field is generated by an rf induction generator 24 and applied to the laser rod 12 by an rf coil 22 of one or two turns. FIG. 4a shows the waveshapes for the applied magnetic fields. There is a steady, or bias field, value due to the invariant or DC magnetic field and the *rf* field is a sawtooth wave which is superimposed on the steady value. FIG. 4b shows the induced azimuthal electric field, $E_\theta$, which results from the time rate of change of the *rf* magnetic fields. The electric field shows a large positive value for a short time and a small negative value for most of the sawtooth period. The pump-lamp trigger pulses are timed to occur at the same times as the large positive spikes of the electric field, $E_\theta$, so that the lamp flashes and creates its electron-hole charge carriers simultaneously with the maximum current-creating effect of the *rf* field.

In the embodiment of FIG. 3, the pump 18 flashes and creates electron-hole pairs in the rod 12. At the same time, the sharp rise of the sawtooth *rf* magnetic field induces an azimuthal electric field, $E_\theta$, (see FIG. 4b) which, in turn, causes the charge carriers to flow as an azimuthal current, $I_\theta$. The interaction of the azimuthal current, $I_\theta$, and the magnetic field, B, in turn causes a radial ambipolar current flow, $L_r$. When the magnetic field and its time rate of change are the same sign (period $T_1$) the direction of azimuthal flow of current is such that the current-field interaction produces a radially inward flow of charge carriers; when the magnetic field and its time rate of change are different (period $T_2$), a radially outward flow of charge carriers results. However, due to the much higher quantitative value of $E_\theta$ during period $T_1$ the inward-flow effect is much greater than the outward-flow effect. This inward-flow results in an excess of electron-hole pairs in the center of the rod 12 and increased efficiency in the emission of laser light from the rod 12.

Obviously, the device can be operated on a sinusoidal *rf*, rather than a sawtooth *rf*, waveform with some loss of efficiency. Also, if the *rf* induction field is large enough, it will produce PN pairs by ionization (hot carrier injection), augmenting those produced by the pump lamp. It is possible, in this case, to operate the device without the flashlamp, relying only on the *rf* field to produce the PN pairs.

Figure 5A:
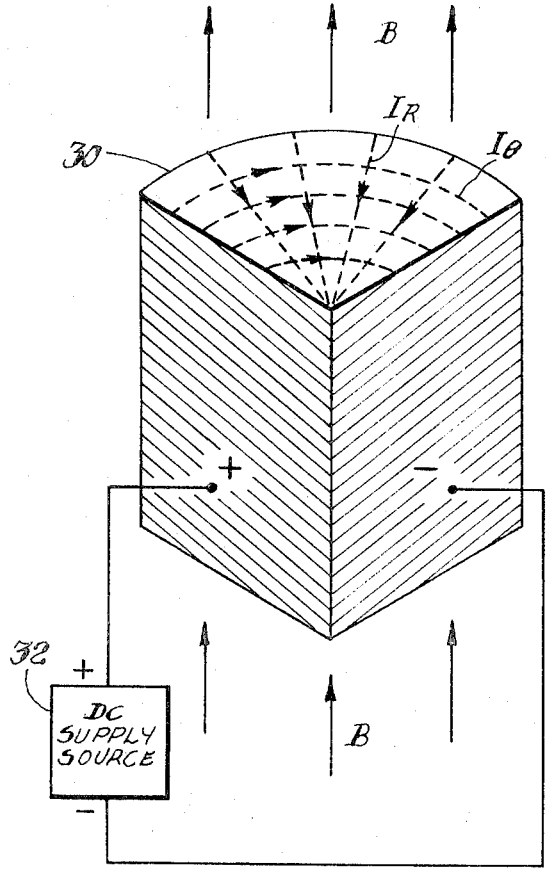
FIG. 5A is a schematic which illustrates the physical aspects of one section of the laser rod of the embodiment shown in FIG. 5B.
Figure 5B:
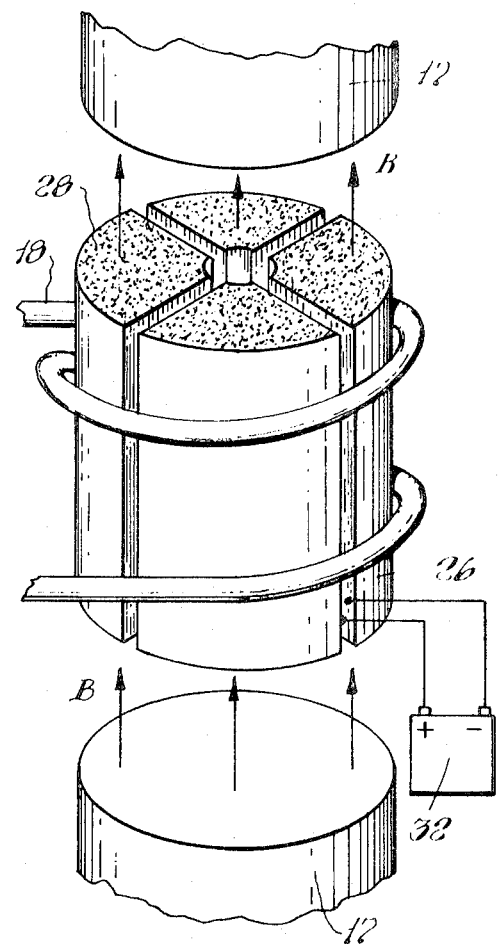
FIG. 5B is a schematic illustration of an embodiment which utilizes an axial magnetic field and an azimuthal electric field.

Another embodiment of the pinch effect laser illustrated in FIG. 5B. Here the semiconductor rod is cut into four quadrants. A steady axial magnetic field B, is supplied and the tops and bottoms of the segments 26 are reflectively coated 28, preferably with dielectric materials such as high purity silicon or germanium. The physics of the device is shown in FIG. 5A. The sides of the wedge or quadrant 30 are conductively coated to form electrodes which are properly wired to the positive and negative terminals of a DC supply source 32. Radial equipotential lines are established by the applied potential. When the pump lamp 18 flashes and increases conductivity, the injected PN pairs will flow in an azimuthal current, $I_\theta$, and the steady magnetic field, B, will cause an inwardly radial ambipolar diffusion current, $I_r$, of the PN pairs.

Figure 6:
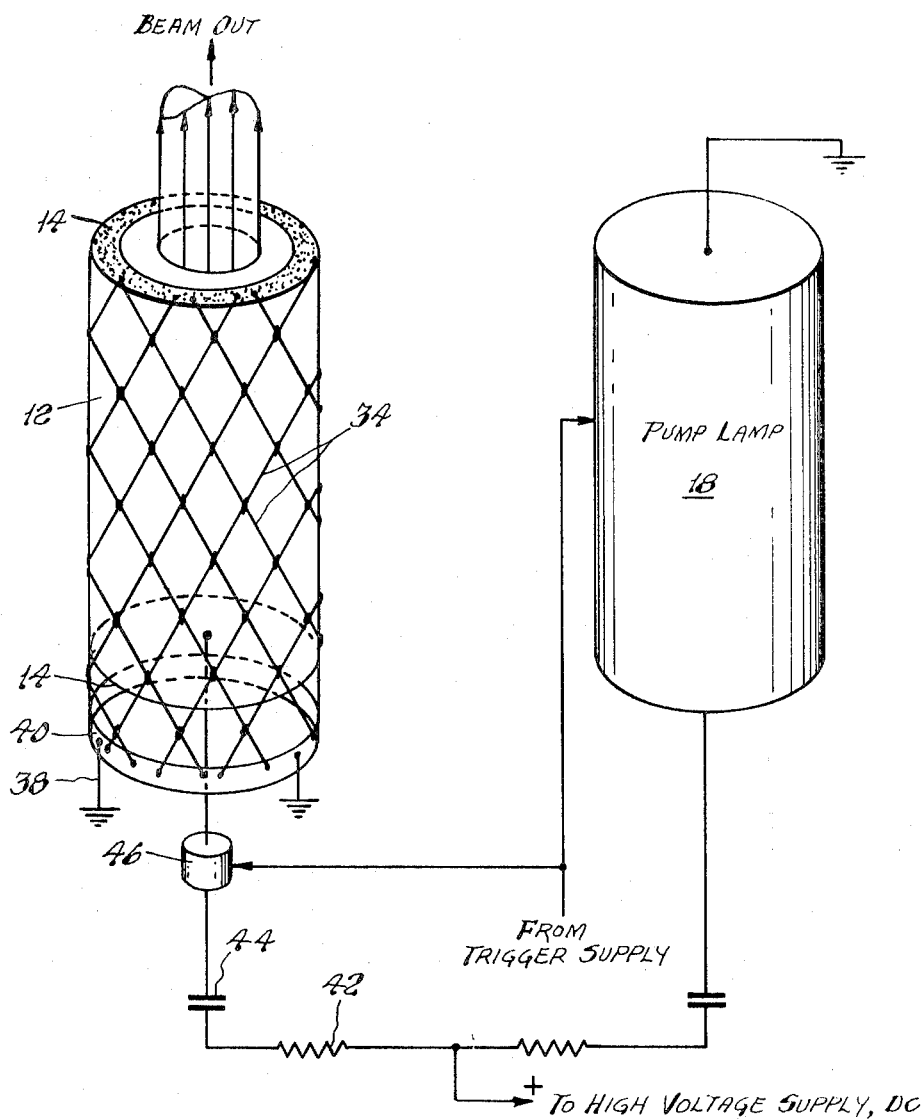
FIG. 6 is a schematic illustration of an embodiment which confines the magnetic field within the laser rod itself.

A final embodiment of the invention is provided in FIG. 6. Here the semiconductor rod 12 has light-reflective, conductive coatings 14 at both ends. A mesh 34 of conductive material such as copper is connected to the upper coating 14 and is also grounded 38, the ground being made to a metal ring 40 to which the lower wire ends are fastened. The wire mesh 34 has an insulating coating, and hugs the outer surface of the laser rod 12.

A high direct voltage is applied to the laser rod 12, the positive potential being applied from the supply source through a resistor 42, capacitor 44 and switching (TR) tube 46 to the coating on the lower end of the rod 12. The same supply source can be used to flash the pump 18. The trigger pulse can be used both to trigger the flash and to permit the direct voltage to be applied to the laser rod 12.

The advantage of encircling the laser rod 12 by the grounded conductive mesh 34 is that the magnetic field associated with the currents in the rod is confined to the rod by the mesh. This reduces the inductance of the laser circuit and therefore the characteristic impedance, which permits higher surge currents through the laser rod for a given voltage on the capacitor 44.

The materials used in the semiconductor laser rod should have the following properties:
1. A direct or nearly direct band-gap.
2. Electron-to-hole mobility ratio ($b=\mu_n/\mu_p$) less than 5, and preferably 1.
3. Sharp resonance line between donor and acceptor laser levels.
4. High carrier mobilities.
5. Preferably slightly P-type material.

A material doped so that $P=nb^2$ at equilibrium is suitable.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A pinch-effect laser comprising, in combination:
    laser means for emitting laser light including a cylindrical light-emitting laser rod having an axis, a Fabry-Perot type optical cavity having an axis along said rod axis, said cavity being resonant to the desired emitting radiation, said rod being a member of semiconductor material and pumping means for creating free charge carriers in said semiconductor material by directing optical pulses transverse to said rod axis; and
    field-producing means for creating a field along said rod axis with said semiconductor material, the geometrical orientation of said laser rod and said field producing a Lorentz force which acts upon said charge carriers causing them to move toward the center of said laser rod so that the concentration of charge carriers becomes higher in the central than in the peripheral volume of said rod.

2. A pinch effect laser as in claim 1, wherein said semiconductor material has an electron-to-hole mobility ratio of less than 5, has high carrier mobilities and is doped so that the following relationship substantially holds: $P=nb^2$.

3. A pinch-effect laser as in claim 2, wherein said field-producing means comprises means for producing an axial, invariant electric field within said rod.

4. A pinch-effect laser as in claim 2, wherein said field-producing means comprises means for producing an axial, invariant magnetic field and a superposed cyclical *rf* induction field within said rod, said *rf* induction field having a fast rate of increase and a slow rate of decrease within each cycle, the geometrical arrangement being such that the signs of the increasing *rf* induction field and the invariant magnetic field are the same.

5. A pinch-effect laser as in claim 2, wherein said field-producing means comprises means for producing an axial, invariant magnetic field within said rod.

6. A pinch-effect laser as in claim 2, wherein said rod contains an axial hole through the center thereof and is divided into four segments by two intersecting axial cuts, a transverse cross section of the rod having four equal, substantially pie-shaped wedges therein, the axial sides of each segment being coated by an electrically conductive coating, said coatings being electrically insulated from each other;
    wherein said laser device also includes means for connecting said coatings to the positive and negative terminals of a source of direct voltage, said connection means being arranged so that, in progressing azimuthally around said rod, said coatings will be alternately connected to the positive and negative terminals;
    wherein said field-producing means comprises means for producing an axial, invariant magnetic field in such direction that the interaction of the azimuthal charge-carrier current, which is produced by the correct connection of said coatings to a source of direct voltage, and the invariant, axial, magnetic field produces an inward radial movement of the charge carriers.

7. A pinch-effect laser as in claim 3, said laser further including wire mesh means enclosing the outer surface of said laser rod and attached electrically to the end reflective coating at one end of said rod;

said electric-field producing means comprising a source of direct voltage having a positive and a negative terminal, one said terminal being electrically connected with one end reflective coating and the other said terminal being electrically connected with the other and reflective coating of said laser rod;

said end reflective coatings being formed from electrically conductive material and said wire mesh being formed from a conductive material.

* * * * *